July 15, 1969 MASAHISA MIYAGI 3,456,202

POWER LEVEL CONTROL SYSTEM FOR INTERMITTENT MULTIFREQUENCY WAVES

Filed March 21, 1966 3 Sheets-Sheet 1

INVENTOR.
MASAHISA MIYAGI

BY

Hopgood & Calimafde
ATTORNEYS.

INVENTOR.
MASAHISA MIYAGI
BY
Hopgood & Calimafde
ATTORNEYS.

INVENTOR.
MASAHISA MIYAGI
BY
Hopgood & Calimafde
ATTORNEYS.

United States Patent Office 3,456,202

Patented July 15, 1969

3,456,202

POWER LEVEL CONTROL SYSTEM FOR INTERMITTENT MULTIFREQUENCY WAVES

Masahisa Miyagi, Tokyo, Japan, assignor to Nippon Electric Company Limited, Tokyo, Japan, a corporation of Japan Filed Mar. 21, 1966, Ser. No. 535,803
Claims priority, application Japan, Mar. 22, 1965, 40/16,624
Int. Cl. H03b *3/02;* H04b *1/66;* H04l *5/22*
U.S. Cl. 328—168 2 Claims The present invention relates to a system for uniformly controlling the power level of each of a plurality of intermittent carrier waves, which are applied to a single power amplifier of non-linear gain characteristic.

The amplification of multifrequency carrier waves by means of a non-linear amplifier is well known and an example may be found in the I.R.E. International Convention Record, part 8, 1961, pages 134–149. No one, however, has successfully met the problem of the existent inequalities between the input levels of the multifrequency carriers resulting in weaker inputs being further weakened and stronger inputs being further strengthened (due to the amplifier non-linearity). This problem is further exaggerated when the multifrequency carrier waves are spontaneously intermittent. The latter occurs, for example, in radio telephony where a carrier wave is interrupted in accordance with speaking tones, so that it is transmitted only when voice frequency oscillations are present.

Briefly, the present invention is predicated upon the concept of applying one or more sets of signals, each including a plurality of intermittent multifrequency carriers to a common amplifier of non-linear gain; sensing the interruption of each of said multifrequency carriers; interrupting the detected output of a continuous pilot carrier assigned to the particular set in response to the sensed interruptions of the intermittent multifrequency carrier; and comparing the detected output of each of the intermittent multifrequency carrier waves individually and successively (in a time division manner) with the detected output of the pilot carrier which has been interrupted successively in response to the sensed interruptions of each of the multifrequency carriers. Finally, the comparison is utilized to control all the power levels of the intermittent multifrequency carrier waves included in the set of signals to which the pilot carrier belongs.

The above-mentioned and other features and objects of this invention and the manner of attaining them will become more apparent and the invention itself will best be understood by reference to the following description of an embodiment of the invention taken in conjunction with the accompanying drawings wherein.

Figure 1:
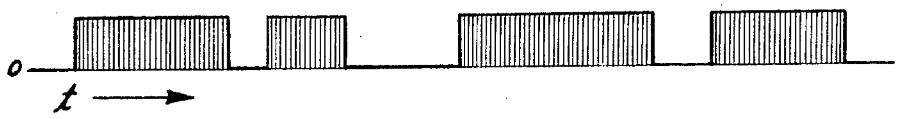
FIG. 1 is a graphic illustration of an example of a waveform of an intermittent multifrequency carrier wave.

Turning now to FIG. 1, there is shown an example of a waveform of a multifrequency carrier wave; the horizontal and vertical axes representing time and amplitude, respectively. Assuming that the contents of the transmitted signal are voices, and the carrier waves are frequency or phase-modulated by these voices, the amplitude of the waves will remain constant. If the carrier is transmitted only during the time which speech takes place, the result will be the intermittent wave shown in FIG. 1. Alternatively, if the contents of the transmitted signal are coded signals and the carrier wave is amplitude modulated, the carrier will again be transmitted only during "marked" periods, and the resultant waveform will be that illustrated in FIG. 1.

Figure 2:
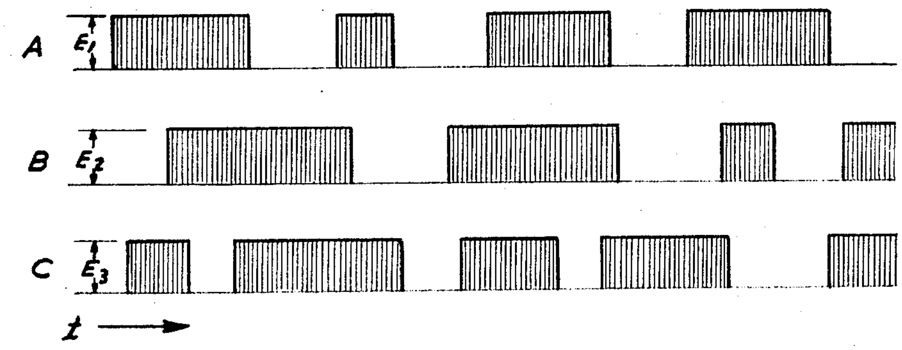
FIG. 2 is a graphic illustration of the waveform of three intermittent carrier waves constituting one signal wave set.

FIG. 2 illustrates the case where three such intermittent carrier waves constitute one signal wave set. These waves, depicted as A, B and C, are independently intermittent. Since, as with FIG. 1, the horizontal axis indicates time and the vertical axis indicates the wave amplitude, the amplitudes of carrier waves A, B and C are represented by $E_1$, $E_2$ and $E_3$, respectively. As a general rule, the amplitudes of these carrier waves are not equal, however, in accordance with the invention, they are made equal at the time they are transmitted and therefore $E_1=E_2=E_3$.

Figure 3:
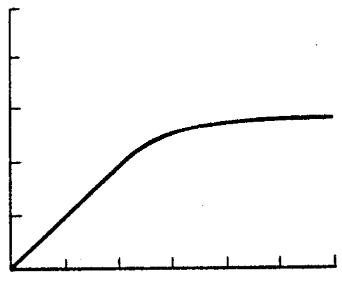
FIG. 3 illustrates the gain characteristics of a non-linear power amplifier.

FIG. 3 illustrates the gain characteristics of one example of a power amplifier for the multiple amplification of intermittent carrier waves. In this figure the horizontal axis represents the input level of a carrier wave of a certain frequency and the vertical axis represents the output level of the carrier wave; the non-linear or saturating characteristics of gain are plainly indicated. In the ordinary case, power amplifiers are operated near the saturated region to improve the transmission efficiency of these waves.

Figure 4:
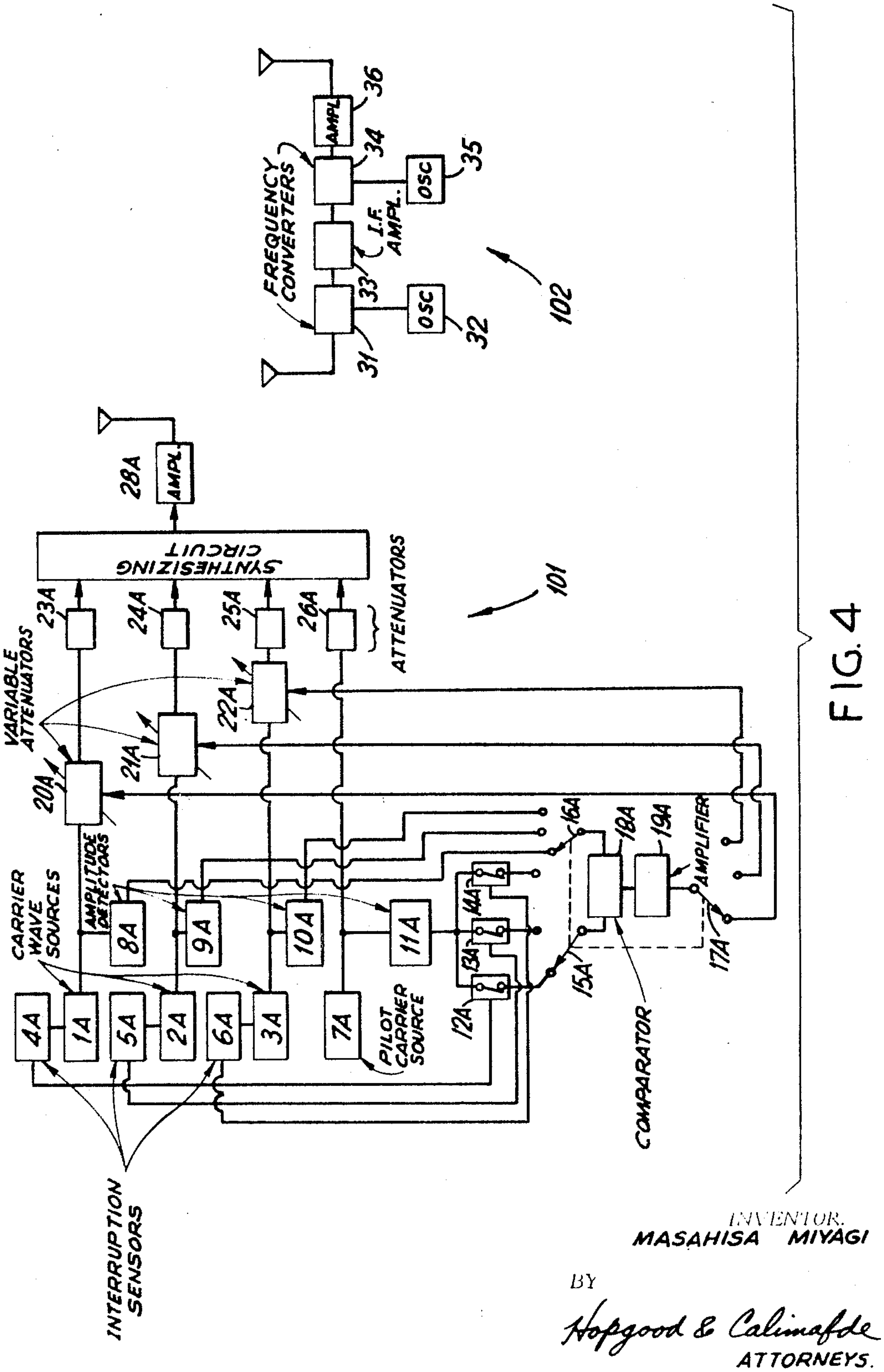
FIG. 4 is a schematic illustration of one embodiment of the invention.

FIG. 4 illustrates one embodiment of the invention with the designations 101 and 102 representing the transmitting and relay stations, respectively. In the embodiment chosen for purposes of description, a single group of multifrequency carrier waves are amplified in common and are controlled by the invention so that each wave in the group is nearly equal in amplitude at the time it reaches the non-linear amplifier. It is to be clearly understood, however, that the circuitry designated by the nomenclature 101 may be redundant several times, each independent circuit thereby representing a group or set of intermittent multifrequency carriers which is ultimately to be received and relayed by the relay station 102.

The intermittent carrier wave outputs available from sources 1*a*, 2*a* and 3*a* are respectively sensed by the carrier break or interruption sensors 4*a*, 5*a* and 6*a*, each of which senses a break in the associated carrier wave. The pilot carrier wave provided for each group or set of multi-frequency carrier waves is continuously available from the source 7*a*. The output level of the carrier waves and the pilot carrier wave is detected by the respective amplitude detectors 8*a* through 11*a*.

Switches 12*a*, 13*a* and 14*a* are operated by the corresponding break sensors, 4*a*, 5*a*, and 6*a* to render these switches in a closed position when carrier waves exist and in an open position when the respective waves are interrupted. Transfer devices 15*a*, 16*a* and 17*a* are switched in synchronism with a predetermined repetition frequency. These transfer devices are necessary when the output control of the power amplifier is performed in a time division manner. Since one pilot carrier is being used as a standard, it is necessary to transfer all the transfer devices belonging to the same set of signalling waves in synchronism. Synchronism between different coiner sets (such as would be present if one were to consider the transmitting station designated as 101 as having redundant counterparts 101', 101'', etc.) is not necessary. Comparator 18a compares the amplitude of the output from the pilot carrier amplitude detector 11a to those of the amplitude detectors 8a through 10a for the other carrier waves. The comparator output is amplified by the amplifier 19a, the output from which serves to control the automatic gain control circuits (as will be described).

20a, 21a and 22a designate variable attenuators for the automatic control circuits and may, for example, be constructed of ordinary attenuators controlled by motors. Behind each of these attenuators in the circuit is a fixed attenuator (23a through 25a). These latter attenuators (and one is also provided for the pilot carrier) are utilized to provide some predetermined differences between levels of the multifrequency carrier waves and the pilot carrier waves after they have been compared at the same power level. For example, when the power carrier is to be transmitted at a lower level than the other multifrequency carrier waves, for purposes of economy, the waves are first set substantially equal by means of the automatic controls, and then dropped to the respective lower levels desired by the fixed attenuators. Automatic control of the respective carrier wave sources is afforded by the time switched comparison of the carrier wave detector vis-a-vis the pilot carrier detector; the comparator output then being utilized to control the variable attenuators in any manner well known in the art.

The outputs from attenuators 23a–26a are led to a synthesizing circuit 27a where the multifrequency carrier waves are combined so that they may be amplified in common by the power amplifier 28a, which may, if desired, include frequency converters.

In the relay station 102, the received signal is changed in frequency by the frequency converter 31 fed by oscillator 32, amplified by the intermediate frequency amplifier 33 and converted for transmission by the frequency converter 34 fed by local oscillator 35. All of the intermediate multifrequency carrier waves transmitted from transmitting station 101 (and any redundant stations as explained) are received and amplified in the relay station 102 and furnished to a common power amplifier 36 for transmission. The gain characteristic of this amplifier is that indicated in FIG. 3. While not specifically described herein, it is possible to utilize a receiving terminal in the transmitting station so arranged to compare the transmitted wave from that station and the pilot carrier waves from other stations, and as a consequence of the comparison, set the transmission power levels of the multifrequency carrier waves to a common level.

Figure 5:
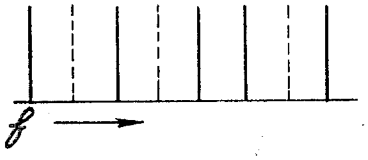
FIG. 5 is a graphic illustration of one example of the frequency relationship where the intermittent multi-frequency carrier waves are applied to the non-linear amplifier in the embodiment shown in FIG. 4.

FIG. 5 illustrates an example of the frequency relation of the embodiment shown in FIG. 4 where the intermittent multifrequency carrier waves are applied to a common amplifier having non-linear characteristics. In this figure the horizontal axis represents frequency and the vertical axis represents amplitude. The dotted lines indicate the carrier lines in the interrupted state, and the solid lines indicate the carrier waves in the "marked" state. It may be seen that the multifrequency carrier waves in the marked condition have almost equal amplitudes. Two waves within those indicated by the full lines are the pilot carriers, each of which is included in each set of multifrequency carrier waves so arranged that they have equal frequency differences.

Figure 6:
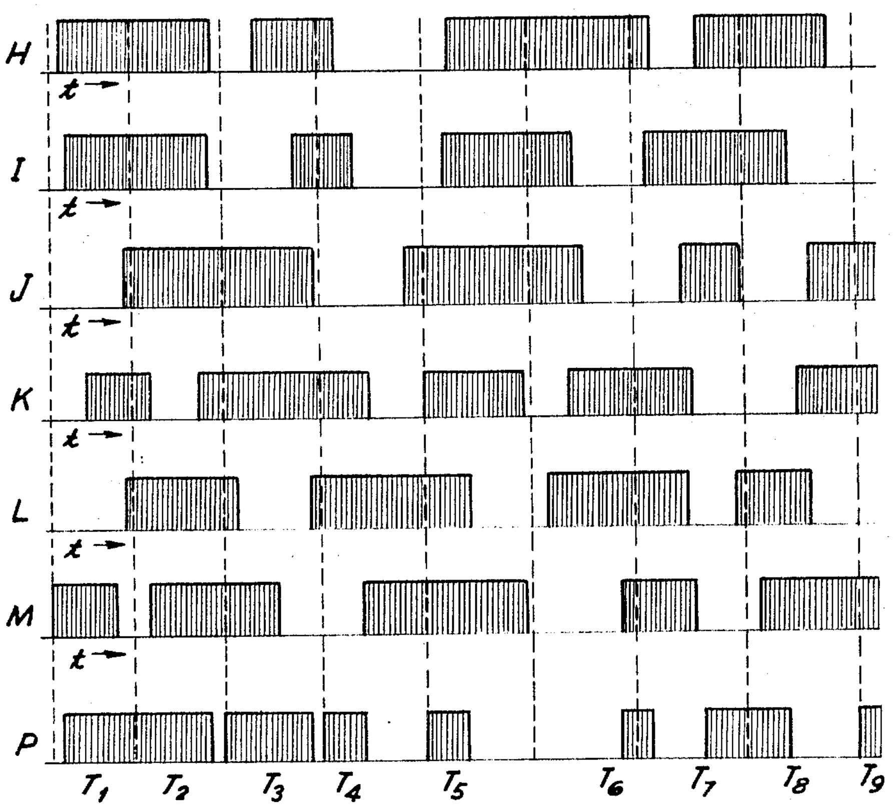
FIG. 6 is a graphic illustration of the carrier wave relationship to the pilot wave where the control means is of the time division type.

FIG. 6 illustrates a case where the power level control system of the embodiment of FIG. 4 is utilized for six multifrequency carrier waves. In this figure, the horizontal axis represents time and the letters H, I, J, K, L, and M indicate, respectively, the outputs of the amplitude detectors for the six multifrequency carrier waves; the intermittent features being plainly shown. P indicates the output of the amplitude detector for the pilot carrier wave. The pilot carrier wave is sent out continuously. Accordingly, one would visualize the output of the amplitude detector to be also continuous; however, this output is interrupted in response to the interruption in the multifrequency carrier wave.

Both the outputs of the amplitude detectors for the multifrequency carrier waves and the output for the pilot carrier wave detector are divided into a number of time divisions, $T_1$ through $T_9$, having almost equal duration. In the first period, $T_1$, the output H for the first carrier wave is compared with the output of the pilot carrier wave. This would correspond, for example, in the embodiment of FIG. 4, to switches 15a through 17a being in the first position. Initially, that is at the first moment, the first carrier wave is in the interrupted state. Accordingly, switch 12a would be open and the detected carrier would be, for all intents and purposes, zero. In the remainder of period $T_1$, carrier H exists and therefore switch 12a is closed and a comparison may be made between this wave and the detected pilot. In the period $T_2$, the output of the pilot carrier detector is, as may be seen, synchronized with the intermittence of the output I, the detector for the second carrier wave. Likewise, in the period $T_3$, the pilot carrier is synchronized with the interruption in the third carrier wave. Thus, after six outputs are successively compared with the output of the pilot carrier wave in the period $T_7$, the output of the pilot carrier wave is again synchronized with the first output H, of the first carrier wave. In this way, the output levels of the multifrequency carrier waves from the respective amplitude detectors are compared in the time division manner with the output of the pilot carrier wave and can be automatically controlled so that the power levels of the intermittent multifrequency carrier waves are equal at the time of transmission.

With the power level control system of the invention, an effective means is provided for improving the overall characteristics of the transmission circuits and effectively utilizing the transmission power available.

While the principles of the invention have been described in connection with specific apparatus, it is to be clearly understood that this description is made only by way of example and not as a limitation to the scope of the invention as set forth in the objects thereof and in the accompanying claims.

I claim:

1. A power level control system for intermittent multifrequency carrier waves to be applied to a common power amplifier of non-linear gain characteristics comprising:
- means for sensing the interrupted state of each of said intermittent multifrequency carrier waves;
- a pilot carrier source;
- a pilot carrier detector coupled to said pilot carrier source;
- means coupled to said sensing means for interrupting the detected pilot carrier in accordance with successive of said interruption sensing means;
- a carrier wave detector for each of said multifrequency carrier waves;
- means for successively and synchronously comparing the detected output of each of said intermittent multifrequency carrier waves with the interrupted detected output of said pilot carrier waves; and
- means responsive to a comparison between a pilot wave and carrier wave for adjusting the output of said carrier wave to the non-linear amplifier.

2. The method of applying one or more sets of signals, each including a plurality of intermittent multifrequency carriers to a common amplifier of non-linear gain comprising the steps of:
- sensing the interruption of each of said multifrequency carriers; interrupting the detected output of a continuous pilot carrier assigned to the particular set in response to the sensed interruptions of the intermittent multifrequency carrier;
- comparing the detected output of each of the intermittent multifrequency carrier waves individually and successively with the detected output of the pilot carrier; and
- controlling the power levels of the intermittent multifrequency carrier waves included in the set of signals to which the pilot carrier belongs with the successive comparison signals.

References Cited

UNITED STATES PATENTS

| | | | |
|---|---|---|---|
| 1,658,856 | 1928 | Potter | 325—62 |
| 1,677,224 | 1928 | Affel | 325—62 |

| | | | |
|---|---|---|---|
| 3,271,679 | 9/1966 | Fostoff | 325—65 |
| 3,315,164 | 4/1967 | Ferguson | 325—65 |

ARTHUR GAUSS, Primary Examiner

HAROLD DIXON, Assistant Examiner

U.S. Cl. X.R.

325—62, 147; 343—178